UNITED STATES PATENT OFFICE.

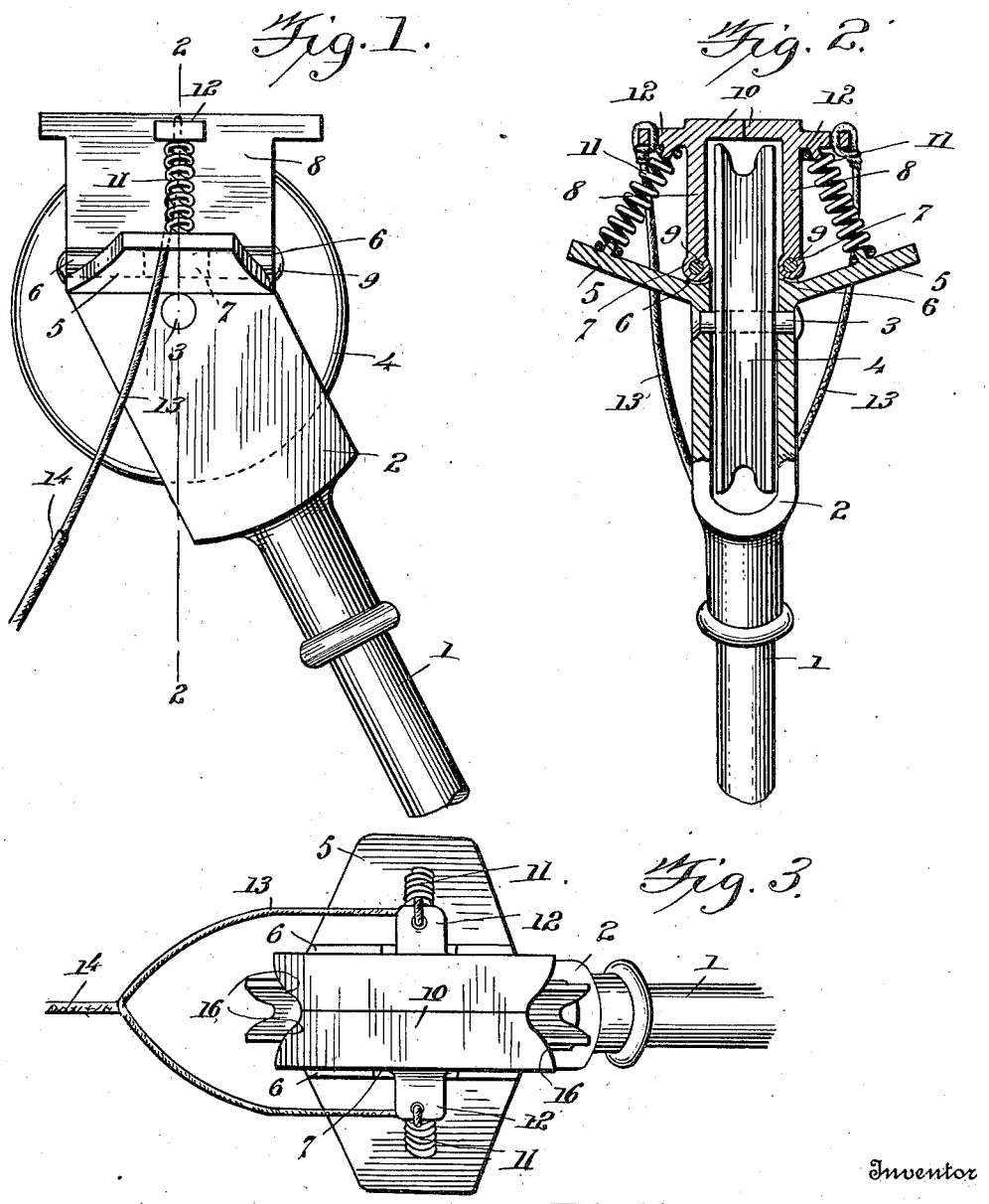

EDWARD W. WARNICK, OF CUYAHOGA FALLS, OHIO.

TROLLEY-WHEEL GUARD.

1,093,507.  Specification of Letters Patent.  Patented Apr. 14, 1914.

Application filed October 1, 1913. Serial No. 792,851.

*To all whom it may concern:*

Be it known that I, EDWARD W. WARNICK, a citizen of the United States, residing at Cuyahoga Falls, in the county of Summit and State of Ohio, have invented new and useful Improvements in Trolley-Wheel Guards, of which the following is a specification.

This invention relates to improvements in trolley wheel guards, whereby the trolley wheel is held in engagement with the wire.

In carrying out the present invention, it is my purpose to provide a guard of the class described by means of which the trolley wheel will be held in engagement with the wire and which will open up automatically when passing a hanger or support so that the wheel may traverse the wire with ease and facility.

It is also my purpose to provide a trolley wheel guard which will normally overlie the trolley wire and hold the wheel against jumping the wire and which may be readily and conveniently manipulated to inactive position so that the trolley pole may be subsequently lowered.

A further object of the invention is the provision of a trolley wheel guard which will embrace the desired features of simplicity, efficiency and durability and which may be manufactured, installed and maintained at a minimum expense.

With the above and other objects in view, the invention consists in the construction, combination and arrangement of parts hereinafter set forth in and falling within the scope of the claim.

In the accompanying drawings: Figure 1 is a view in side elevation of a trolley harp, equipped with a guard constructed in accordance with the present invention; Fig. 2 is a vertical sectional view on the line 2—2 of Fig. 1; and Fig. 3 is a top plan view of the guard.

Referring now to the accompanying drawings in detail, the numeral 1 designates the upper end portion of a trolley pole while 2 designates the usual form of trolley harp connected to the upper end of the pole and provided with horizontally alining bearings in the opposite limbs thereof, in which is journaled the axle 3 carrying the trolley wheel 4, the latter having the usual peripheral groove formed therein to engage the trolley wire.

My improved guard comprises wings 5—5 fixed to the opposite limbs of the harp and extending outwardly therefrom and inclined upwardly. In the present instance, the upper surface of each wing 5, immediately adjacent to the respective limb of the trolley harp, is formed with upwardly-extending pivot lugs 6—6 appropriately spaced apart and alining with each other and disposed between such lugs is a similar lug 7 formed on the lower longitudinal edge of a plate 8 and passed through these lugs 6 and 7 is a pivot pin 9. The plates 8—8 at the opposite sides of the trolley harp are normally disposed in a vertical plane and have the upper edges thereof terminating in the same plane and in a plane above that of the trolley wire, and suitably connected to such edges and extending toward each other are flanges 10—10 having the inner edges thereof normally in engagement with each other, such flanges overlying the trolley wire and preventing the trolley from jumping the wires.

In order to hold the plates 8—8 in normal position, coiled expansion springs 11—11 are provided, each having one end resting upon a wing 5 and secured thereto, and the opposite end abutting the block 12 and secured thereto, such block being fastened to the outer surface of the respective plate 8 adjacent to the upper edge thereof. Fastened to the blocks 12 and depending therefrom are cords 13, 13 having the lower ends thereof merging into the trolley rope 14.

From the foregoing description, taken in connection with the accompanying drawings, the construction, mode of operation and manner of employing my invention will be readily apparent. While the trolley wheel is in engagement with the wire the plates 8—8 are normally held in vertical positions, incident to the springs 11—11 and flanges 10—10 overlapping the trolley wire and have the confronting edges in engagement so that the possibility of the wheel accidentally leaving the wire is avoided. The confronting edges of the flanges 10, as clearly illustrated in the drawings, are rounded, as at 16—16 so as to form an entrance mouth whereby when the trolley wheel passes a support or hanger the plates 8—8 may be swung about their pivots against the action of the springs 11, so that the guard will open up and permit the wheel to pass unimpeded along the wire, the springs reacting and restoring the plates to normal position subsequently to the wheel passing the hanger. When it is desired to lower the trolley, a pull is exerted upon the cord 14, whereby the plates 8—8 are first swung about their pivots to open up the guard, the plates coming into contact with the upper surface of the wings 5—5 whereby further movement thereof under the pulling action is avoided. In the continued pulling of the trolley cord the pole is lowered and the wheel disengaged from the wire as is readily apparent.

I claim:—

In a trolley guard, a harp, a trolley wheel therein adapted to engage the wire, wings extending outwardly from the opposite sides of said harp and rigidly secured thereto, plates disposed at the opposite sides of said harp and having the lower edges thereof pivotally connected to said wings at the inner edges thereof, flanges formed on the upper edges of said plates and having the confronting edges thereof in engagement and normally overlying the trolley wire, means for swinging said plates about their pivot points so that the guard will be opened said wings serving to limit the movement of the plates to open position whereby further pressure upon said plates will lower the trolley wheel, and springs interposed between said wings and plates and acting to hold the latter in normal position, one end of each spring abutting the upper surface of the respective wing and the opposite end engaging the adjacent plate.

In testimony whereof I affix my signature in presence of two witnesses.

EDWARD W. WARNICK.

Witnesses:
 HARRY C. TREACHER,
 OAKEY T. MCGRAW.